Figure 1:
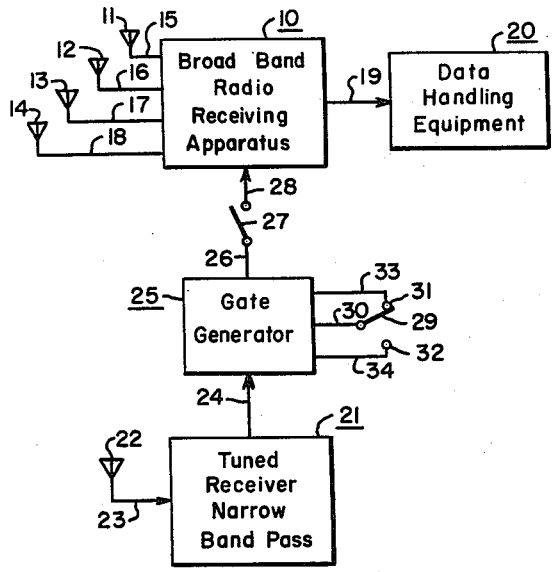

Feb. 12, 1963 P. D. NEWHOUSE 3,077,601
SIGNAL SELECTOR CIRCUIT FOR PASSIVE DETECTION APPARATUS
Filed Jan. 30, 1958

WITNESSES:
Bernard R. Giegner
Edwin E. Bassler

INVENTOR
Paul D. Newhouse
BY Maury I. Hall
ATTORNEY

United States Patent Office 3,077,601
Patented Feb. 12, 1963

3,077,601
SIGNAL SELECTOR CIRCUIT FOR PASSIVE
DETECTION APPARATUS
Paul D. Newhouse, Linthicum Heights, Md., assignor to Westinghouse Electric Corporation, East Pittsburgh, Pa., a corporation of Pennsylvania
Filed Jan. 30, 1958, Ser. No. 712,160
5 Claims. (Cl. 325—303)

This invention relates to improvements in signal selector circuits for passive detection apparatus, and more particularly to such apparatus having circuits for discriminating against received signals of certain frequencies to thereby pass to utilization equipment or reject selected received signals or pulses of radio frequency energy arriving from selected sources. The apparatus is particularly well suited for use in passive detection of pulsed radar signals.

Conventional passive detection apparatus of the prior art usually utilizes a number of wide-open crystal video receiver channels and a set of antennas that operate over the desired frequency band which may be, for example, 1 to 11 kilomegacycles. Under certain tactical situations, it is desirable to be able to pass or reject signals of certain frequencies within the 1 to 11 kilomegacycle band or frequency range of the passive detection apparatus; for example, when the density of the signals from enemy radars is high, the quantity of data supplied by the receiver system becomes so great that data-handling equipment used with the receiver apparatus saturates. To eliminate this saturation, it is desirable to limit the quantity of data, for example, by monitoring only a portion of the 1 to 11 kilomegacycle band at any one time. For example, a narrow pass band may be "scanned" over the overall or total frequency range so that all the signals present can be monitored and analyzed periodically. On the other hand, it may be desirable to reject signals from certain radars, for example, those of known frequencies from friendly aircraft.

The apparatus of the instant invention permits the selection or rejection of desired signals on the basis of their frequencies and also provides for periodically analyzing portions of the receiver spectrum. The instant apparatus employs a tunable receiver with an omnidirectional antenna which is used to provide a gate to the remainder of the passive detection apparatus. This gate, which is generated whenever a pulse of radio-frequency energy in the preselected narrow frequency range is detected by the tuned receiver, is used as desired to either reject or pass a coincident signal from the wide band passive detection receiver apparatus to data-handling equipment energized therefrom.

Accordingly, a primary object of the instant invention is to provide new and improved signal selector apparatus.

Another object is to provide new and improved passive detection apparatus for selecting certain radar signals and rejecting certain other radar signals on the basis of their frequencies.

Still another object is to provide new and improved passive detection apparatus in which portions of the overall frequency response range of the receiver may be periodically analyzed.

Other objects and advantages will become apparent after a study of the following specification when read in connection with the accompanying drawings, in which:

FIGURE 1 is an electrical circuit diagram, in block form, of apparatus according to the preferred embodiment of the invention; and FIGS. 2A, 2B, 2C, 2D and 2E are graphs illustrating the operation of the apparatus of FIG. 1.

In FIG. 1, to which particular attention is directed, there is shown in block form and generally designated 10, passive detection apparatus including receiver apparatus which may be responsive to received energy in a preselected frequency range, for example, 1 to 11 kilomegacycles. The passive detection apparatus 10 has operatively connected thereto to supply input signals a plurality of preferably directional antennas designated 11, 12, 13 and 14, connected to the passive detection apparatus 10 by lead means 15, 16, 17 and 18, respectively. The passive detection appartaus 10 may supply by conducting means 19, outputs or signals for use by data-handling equipment shown in block form and generally designated 20. For example, the passive detection apparatus and/or data handling equipment may include means for providing information regarding the direction to the source of the signal with respect to the location of the passive detection apparatus, or the apparatus may, for example, comprise or include means for computing the closing time between the passive detection apparatus and the target source.

Passive detection apparatus 10 includes means, not shown, of any convenient design for utilizing gate pulses or gate signals supplied thereto on lead 28 to control the passage of coincident signals obtained from any of the antennas 11, 12, 13 and 14 to output lead means 19 and data-handling equipment 20. The gating means, not shown, may include a circuit which passes all signals while no gate is applied on lead 28, which passes only signals coincident with the gate pulses while positive gate pulses are applied on lead 28, and which rejects only signals coincident with the gate pulses while negative gate pulses are applied on lead 28.

An additional tuned receiver is provided and is shown in block form at 21, the receiver 21 having a narrow band pass and being energized by a signal obtained from a preferably omnidirectional antenna 22 connected to the receiver 21 by conducting means 23. The receiver means 21 may contain means of any convenient design, not shown, whereby the frequency range 1 to 11 kilomegacycles may be rapidly scanned, or the frequency to which the tuned receiver 21 is set may be maintained at some selected or desired value. The receiver 21 may be one of the receivers in an electronic counter measures system, as will be readily understood by those skilled in the art. The output of the receiver 21 is supplied by conducting means 24 to a gate generator of any convenient design shown in block form and generally designated 25, the output of the gate generator 25 being a gate signal or gating pulse of selected variable polarity which is supplied by way of lead 26, switch 27 and lead 28 to the aforementioned passive detection apparatus 10. The gate generator 25 is constructed and arranged to produce periodic gate pulses at the same repetition rate while periodic signals of at least a predetermined minimum amplitude are applied thereto and to have two modes of operation controlled by a switch 29, the arm of the switch 29 being connected by lead 30 to the gate generator 25, and the contacts 31 and 32 of switch 29 being connected by leads 33 and 34 respectively to gate generator 25. The switch 29, while in its upper setting in contact with 31 is in a signal "pass" position or setting and causes gate generator 25 to produce positive gate pulses, and the switch 29, while in its lower setting in contact with 32 is in its signal "reject" position and causes gate generator 25 to produce gate pulses of negative polarity.

Figure 2:
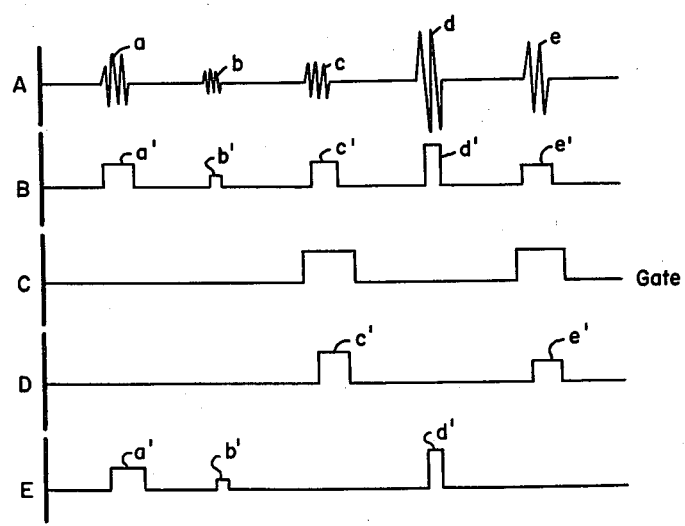

Particular reference should be made now to FIGS. 2A to 2E, inclusive, which are graphs illustrating the operation of the apparatus of FIG. 1. The curve of FIG. 2A represents the wave forms of received signals "a," "b," "c," "d," and "e" from a plurality of sources or targets operating in the 1 to 11 kilomegacycle band. For the purposes of description, it will be assumed that signals "c"

and "e" fall within the band pass to which the tuned receiver 21 is adjusted. The curve of FIG. 2B represents the normal video output from the passive detection apparatus 10 in the absence of a gate applied to lead 28, that is, when the switch 27 is open, pulses "a'," "b'," "c'," "d'," and "e'," being produced by received signals "a," "b," "c," "d," and "e," respectively. The curve of FIG. 2C represents the positive pulse output of the gate generator 25 on lead 28 with switch 27 closed; the curve of FIG. 2D accordingly represents the output of the passive detection apparatus 10 while the switch 29 is adjusted or set to the "pass" position, it being noted that video pulses "c'" and "e'" coincident with the positive gate pulses are passed. The curve of FIG. 2E represents the output of the passive detection apparatus 10 while the switch 29 is set in its "reject" posoition on contact 32 as aforedescribed, and negative gate pulses are applied on lead 28, it being noted that while negative gate pulses are applied, coincident video pulses "c'" and "e'" are rejected and all other video pulses including "a'," "b'," and "d'" are allowed to pass.

In summary, in the operation of the aforedescribed apparatus, in a first mode of operation, the gate generator 25 is not connected by switch 27 with the passive detection apparatus 10, and all signals within the 1 to 11 kilomegacycle frequency band are passed to the data-handling equipment 20. While it is desired that certain frequencies are to be passed or rejected, the gate generator 25 is switched in by closing switch 27, and switch 29 is adjusted to its desired setting in accordance with whether video pulses produced by received signals of certain frequencies are to be rejected or passed. While the gate generator switch 29 is in its "pass" position or setting, the only signals or video pulses which are passed by the passive detection apparatus 10 are those that fall within the narrow band pass of the tuned receiver 21. While the gate generator switch 29 is set in its "reject" position as aforedescribed, the only signals which are not passed by the passive detection apparatus 10 are those which fall within the narrow pass band of the tuned receiver 21.

The utility of passive detection apparatus is enhanced considerably by the use of the frequency discrimination and signal selector apparatus shown herein. This prevents the saturation of the data-handling equipment resulting from a high density of received signals from either enemy or friendly radars or both.

Whereas the invention has been shown and described with particular reference to its use in passive detection equipment, it should be understood that the signal selection and pulse repetition frequency selection circuits shown and described hereinbefore may be used in a number of other different applications.

Whereas the apparatus has been shown and described with respect to a preferred embodiment thereof which gives satisfactory results, it should be understood that changes may be made and equivalents substituted without departing from the spirit and scope of the invention.

I claim as my invention:

1. In radio frequency detection apparatus, in combination, a first receiver of radio frequency signals, a second receiver of radio frequency signals, the first receiver having a broad bandwidth relative to the bandwidth of the second receiver, the second receiver being tunable over the broad bandwidth of the first receiver, a plurality of directional antennas operatively connected to the first receiver for supplying a plurality of pulsed radio frequency signals simultaneously to the first receiver, each of said plurality of pulsed radio frequency signals lying within said broad bandwidth, an omnidirectional antenna operatively connected to the second receiver for supplying said plurality of pulsed radio frequency signals to the second receiver, said second receiver being tuned to and passing to the output thereof only one of the plurality of pulsed radio frequency signals applied to the second receiver, and gate generator means operatively connected to the second receiver for generating a gate signal while a pulse is occurring in the pulsed radio frequency signal passed to the output of the second receiver, said gate generator means being operatively connected to the first receiver, the gate signal from the gate generator means controlling the passage of signals from said plurality of directional antennas to the output of the first receiver selectively in accordance with the time coincidence and lack of time coincident of pulses in any one of said plurality of radio frequency signals with the gate signal.

2. In radio frequency signal selector apparatus, in combination, first receiver means for radio frequency signals, second receiver means for radio frequency signals, the first receiver means having a broad bandwidth relative to the bandwidth of the second receiver means, the second receiver means being tunable over the broad bandwidth of the first receiver means, antenna means for supplying a plurality of pulsed input radio frequency signals of different radio frequencies simultaneously to the first receiver means, all of said radio frequencies falling within said broad bandwidth, other antenna means for supplying said plurality of pulsed radio frequency signals to said second receiver means, said second receiver means being tuned to and passing to the output thereof only one of the plurality of pulsed radio frequency signals applied to the second receiver means, the gate generator means operatively connected to the second receiver means and generating a gate while receiving an output from the second receiver means, said gate generator means being operatively connected to the first receiver means, said first receiver means utilizing the gate from the gate generator means to select certain pulsed signals from the plurality of input signals for passage to the output of the first receiver means and reject other pulsed input signals selectively in accordance with the time relationships between the pulses of the input signals and the gate, the selection of pulsed signals to be passed to the output of the first receiver means being substantially independent of the relative amplitudes of the radio frequency signal inputs to the first receiver means and to the second receiver means.

3. In radio frequency detection apparatus for selecting one pulsed radio frequency signal having a predetermined pulse repetition frequency from a plurality of pulsed radio frequency signals of different radio frequencies and having a plurality of different pulse repetition frequencies, in combination, first and second receiver means, said first receiver means receiving simultaneously a plurality of pulsed signals of a plurality of different radio frequencies, said second receiver means being tuned to one of said plurality of pulsed signals of a selected one radio frequency and passing to the output thereof only pulses of said selected one pulsed radio frequency signal, said second receiver means including gate generator means operatively connected to the first receiver means, said gate generator means generating gate pulses in time coincidence with the pulses of said selected one pulsed radio frequency signal, and utilization means operatively connected to the first receiver means and energized by output pulses from the first receiver means, said first receiver means passing to the utilization means only the pulses in any pulsed radio frequency signal which occur in time coincidence with the gate pulses from the gate generator means, the first receiver means thereby in effect selecting only the pulsed radio frequency signal to which the second receiver means is tuned.

4. In radio frequency signal selector apparatus, in combination, first and second radio receiver means, said first receiver means simultaneously receiving a plurality of pulsed radio frequency signals of a plurality of radio frequencies respectively, said second receiver means receiving a selected one of said plurality of pulsed radio frequency signals, utilization means operatively connected to the first receiver means and energized by output signals from the first receiver means, and gate generating means including switching means, said gate generating means being operatively connected to the first receiver means and to the second receiver means, the gate generating means generating gate pulses coincident with pulses in the radio frequency signal received by the second receiver means and applying the gate pulses to the first receiver means, and switching means having first and second settings, said gate generating means generating a gate pulse of one polarity while the switching means is in a first setting thereof and generating a gate pulse of the opposite polarity while the switching means is in the other setting thereof, said first receiver means passing to the utilization means pulses of any of said plurality of radio frequency signals occurring in time coincidence with the gate pulse while the gate pulse has said one polarity and excluding all pulses not in time coincidence with the gate pulse, said first receiver means passing to the utilization means only pulses not in time coincidence with the gate pulse while the gate pulse has said opposite polarity and excluding pulses in time coincidence.

5. In radio detection apparatus, in combination, first receiver means for simultaneously receiving a plurality of pulsed radio frequency signals, second receiver means for receiving only one of said pulsed radio frequency signals, utilization means operatively connected to the first receiver means and energized by output signals from the first receiver means, and gate generator means operatively connected to the second receiver means and generating a gate while a pulsed signal is received by the second receiver means, said gate generator means being operatively connected to the first receiver means and applying said gate to the first receiver means, said gate being selectively of positive and negative polarity, said first receiver means selectively passing to the utilization means and excluding from the utilization means pulses in any of the plurality of pulsed radio frequency signals which occur in time coincidence with the gate and pulses in any of the plurality of pulsed radio frequency signals which do not occur in time coincidence with the gate selectively in accordance with whether the gate has said positive and negative polarity.

References Cited in the file of this patent

UNITED STATES PATENTS

| | | |
|---|---|---|
| 2,330,241 | Roberts | Sept. 28, 1943 |
| 2,358,448 | Earp | Sept. 19, 1944 |
| 2,471,412 | Clark | May 31, 1949 |
| 2,600,919 | Pritchard | June 17, 1952 |
| 2,794,156 | Mohler et al. | May 28, 1957 |
| 2,825,900 | Collbohm | Mar. 4, 1958 |